United States Patent
Du Hart, IV et al.

(10) Patent No.: US 8,514,762 B2
(45) Date of Patent: Aug. 20, 2013

(54) SYSTEM AND METHOD FOR EMBEDDING TEXT IN MULTICAST TRANSMISSIONS

(75) Inventors: John H. Du Hart, IV, South Setauket, NY (US); Kelly Schlueter, Wadsworth, OH (US); Michael Faith, Coram, NY (US); William Sakoda, East Setauket, NY (US); Stephen F. Paulus, Tallmadge, OH (US); Michael N. Hagans, Medina, OH (US); Edward Moskaluk, Copley, OH (US)

(73) Assignee: Symbol Technologies, Inc., Holtsville, NY (US)

( * ) Notice: Subject to any disclaimer, the term of this patent is extended or adjusted under 35 U.S.C. 154(b) by 1199 days.

(21) Appl. No.: 11/680,226

(22) Filed: Feb. 28, 2007

(65) Prior Publication Data

US 2008/0170532 A1 Jul. 17, 2008

Related U.S. Application Data

(60) Provisional application No. 60/884,781, filed on Jan. 12, 2007.

(51) Int. Cl.
*H04H 20/71* (2008.01)

(52) U.S. Cl.
USPC ........... 370/312; 370/260; 370/261; 370/328; 370/349; 370/352; 370/356; 370/389; 370/432; 455/416; 455/466; 455/518; 455/519

(58) Field of Classification Search
USPC ............ 455/412.1, 412.2, 413, 414.1, 414.2, 455/414.3, 414.4, 415, 418–420, 456.3, 466, 455/517, 550.1, 556.2, 563, 566, 567, 518, 455/404.1, 416, 519; 704/260; 379/88.11, 379/88.12, 88.13; 370/312, 328, 338, 349, 370/352, 356, 389, 432, 260, 261, 262, 263
See application file for complete search history.

(56) References Cited

U.S. PATENT DOCUMENTS

| | | | | |
|---|---|---|---|---|
| 6,654,722 | B1 * | 11/2003 | Aldous et al. | 704/270.1 |
| 6,891,933 | B2 * | 5/2005 | Kumamoto | 379/88.12 |
| 7,215,638 | B1 * | 5/2007 | Roberts et al. | 370/231 |
| 7,224,961 | B2 * | 5/2007 | Ishii | 455/412.1 |
| 7,310,596 | B2 * | 12/2007 | Ota et al. | 704/201 |
| 7,313,522 | B2 * | 12/2007 | Fukuzato | 704/258 |
| 7,337,390 | B2 * | 2/2008 | Lui et al. | 715/230 |
| 7,406,414 | B2 * | 7/2008 | Creamer et al. | 704/235 |

(Continued)

FOREIGN PATENT DOCUMENTS

| WO | WO 2005/107151 A | 11/2005 |
|---|---|---|
| WO | WO 2006/108366 A | 10/2006 |

OTHER PUBLICATIONS

International Preliminary Report on Patentability and the Written Opinion of the International Searching Authority for PCT/US2008/050613 dated Jul. 23, 2009.

(Continued)

*Primary Examiner* — Olumide T Ajibade Akonai
(74) *Attorney, Agent, or Firm* — Nong-Qiang Fan (57) ABSTRACT

A system and method embeds text in a multicast transmission. An exemplary method comprises receiving non-voice data. The non-voice data is embedded within digitized voice data. The digitized voice data with the embedded non-voice data is wirelessly transmitted, by a computing device, as a multicast transmission to a plurality of mobile devices.

13 Claims, 6 Drawing Sheets

(56) References Cited

U.S. PATENT DOCUMENTS

| | | | |
|---|---|---|---|
| 7,529,200 B2 * | 5/2009 | Schmidt et al. | 370/260 |
| 7,620,413 B2 * | 11/2009 | Jen | 455/518 |
| 7,724,743 B2 * | 5/2010 | Razdan et al. | 370/392 |
| 7,725,116 B2 * | 5/2010 | Mumick et al. | 455/466 |
| 7,970,425 B2 * | 6/2011 | Balachandran et al. | 455/519 |
| 7,983,199 B1 * | 7/2011 | Nguyen et al. | 370/260 |
| 2002/0031097 A1 * | 3/2002 | Jung | 370/270 |
| 2002/0194364 A1 | 12/2002 | Chase et al. | |
| 2005/0185678 A1 * | 8/2005 | Tsuchinaga et al. | 370/528 |
| 2006/0030297 A1 * | 2/2006 | Coble et al. | 455/412.1 |
| 2007/0064743 A1 * | 3/2007 | Bettis et al. | 370/503 |
| 2007/0086377 A1 * | 4/2007 | Alapuranen | 370/329 |
| 2008/0056219 A1 * | 3/2008 | Venkatachalam | 370/342 |
| 2008/0062990 A1 * | 3/2008 | Oran | 370/392 |
| 2008/0115162 A1 * | 5/2008 | Yu | 725/34 |
| 2008/0159264 A1 * | 7/2008 | Fleming | 370/352 |
| 2009/0180596 A1 * | 7/2009 | Reynolds et al. | 379/48 |

OTHER PUBLICATIONS

International Search Report and Written Opinion for International Application No. PCT/US2008/050613 mailed on Jun. 3, 2008.

* cited by examiner

SYSTEM AND METHOD FOR EMBEDDING TEXT IN MULTICAST TRANSMISSIONS

PRIORITY CLAIM

This application claims the priority to the U.S. Provisional Application Ser. No. 60/884,781, entitled "System and Method for Embedding Text in Multicast Transmissions," filed Jan. 12, 2007. The specification of the above-identified application is incorporated in its entirety herewith by reference.

FIELD OF THE INVENTION

The present invention relates generally to embedding text data in voice data packets for multicast transmissions.

BACKGROUND

A mobile device may operate as a digital walkie-talkie over Internet Protocol (IP). The digital walkie-talkie over IP may operate on the basis of a half duplex communication system where, although two-way communication may be performed, only one party may send a signal at a time. Once a party begins receiving a signal, it must wait for the transmitter to stop transmitting before replying. A half duplex communication is multicast over a communication network so that one party may transmit the same signal to a plurality of recipients. For example, an audio signal being sent over a particular channel may be multicast to any individual who is tuned into that channel.

A full duplex system utilizing a communication that is unicast includes certain advantages such as identification protocols so a receiving user may know the identity of the sending user. The half duplex system that multicasts a communication does not include these advantageous features. Thus, there is a need to incorporate the features of a unicast call into a multicast call.

SUMMARY OF THE INVENTION

The present invention relates to a system and method for embedding text in a multicast transmission. The method comprises receiving non-voice data. The non-voice data is embedded within digitized voice data. The digitized voice data with the embedded non-voice data is wirelessly transmitted, by a computing device, as a multicast transmission to a plurality of mobile devices.

DETAILED DESCRIPTION

The present invention may be further understood with reference to the following description and the appended drawings, wherein like elements are referred to with the same reference numerals. The exemplary embodiments of the present invention describe a system and method for embedding textual data in digital voice data when placing a multicast call using a mobile device (e.g., computing device, personal computer, laptop, pager, mobile device, cell phone, radio frequency identification device, scanner, etc.). According to the exemplary embodiments of the present invention, the mobile device embeds non-voice data such as textual information (e.g., identification data) when making a multicast transmission. The exemplary embodiments of the present invention include the advantages of a unicast transmission into a multicast transmission. The exemplary embodiments of the present invention will refer to embedding textual information.

Figure 1:
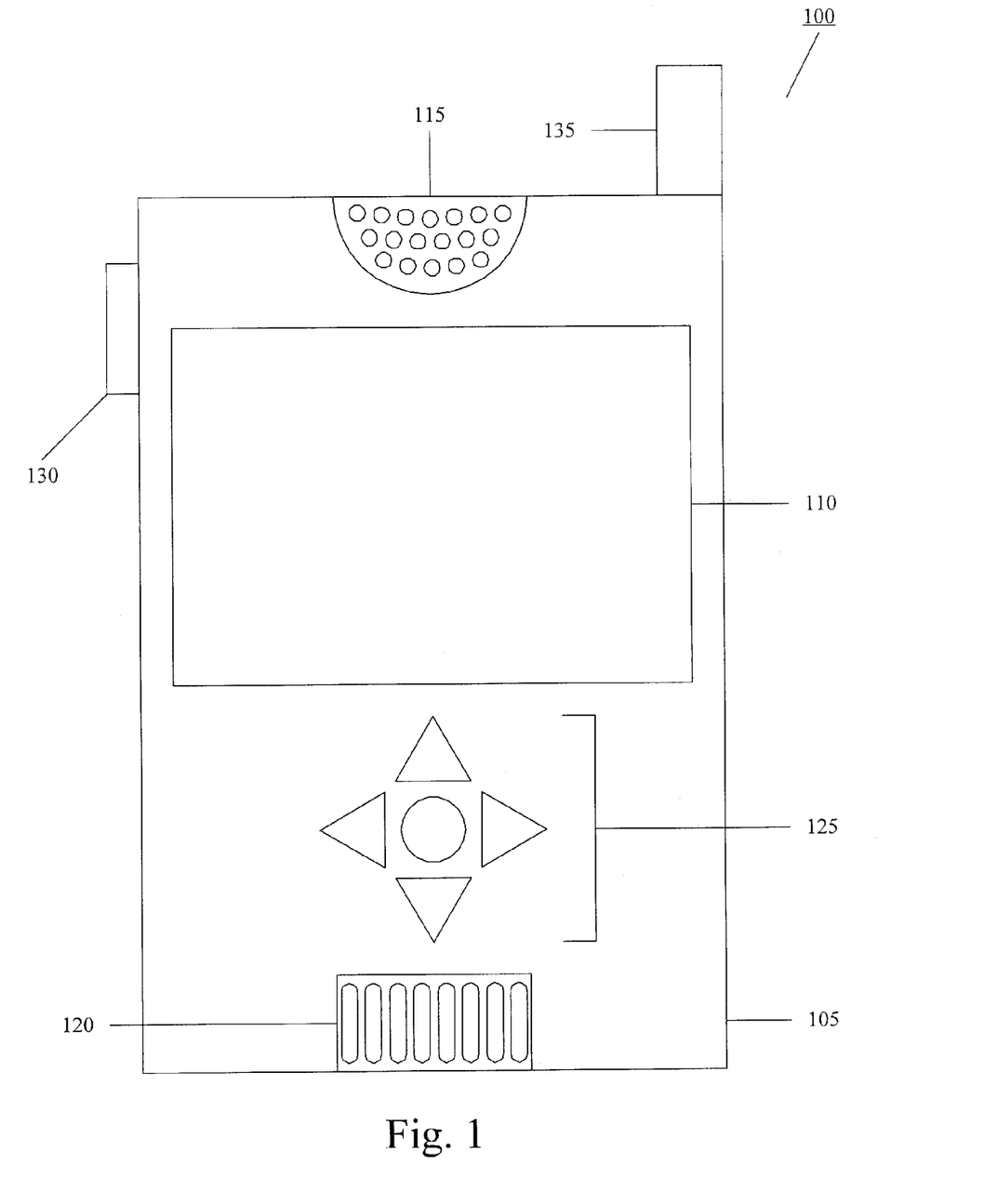
FIG. 1 shows a perspective view of a mobile unit according to an exemplary embodiment of the present invention.
Figure 2:
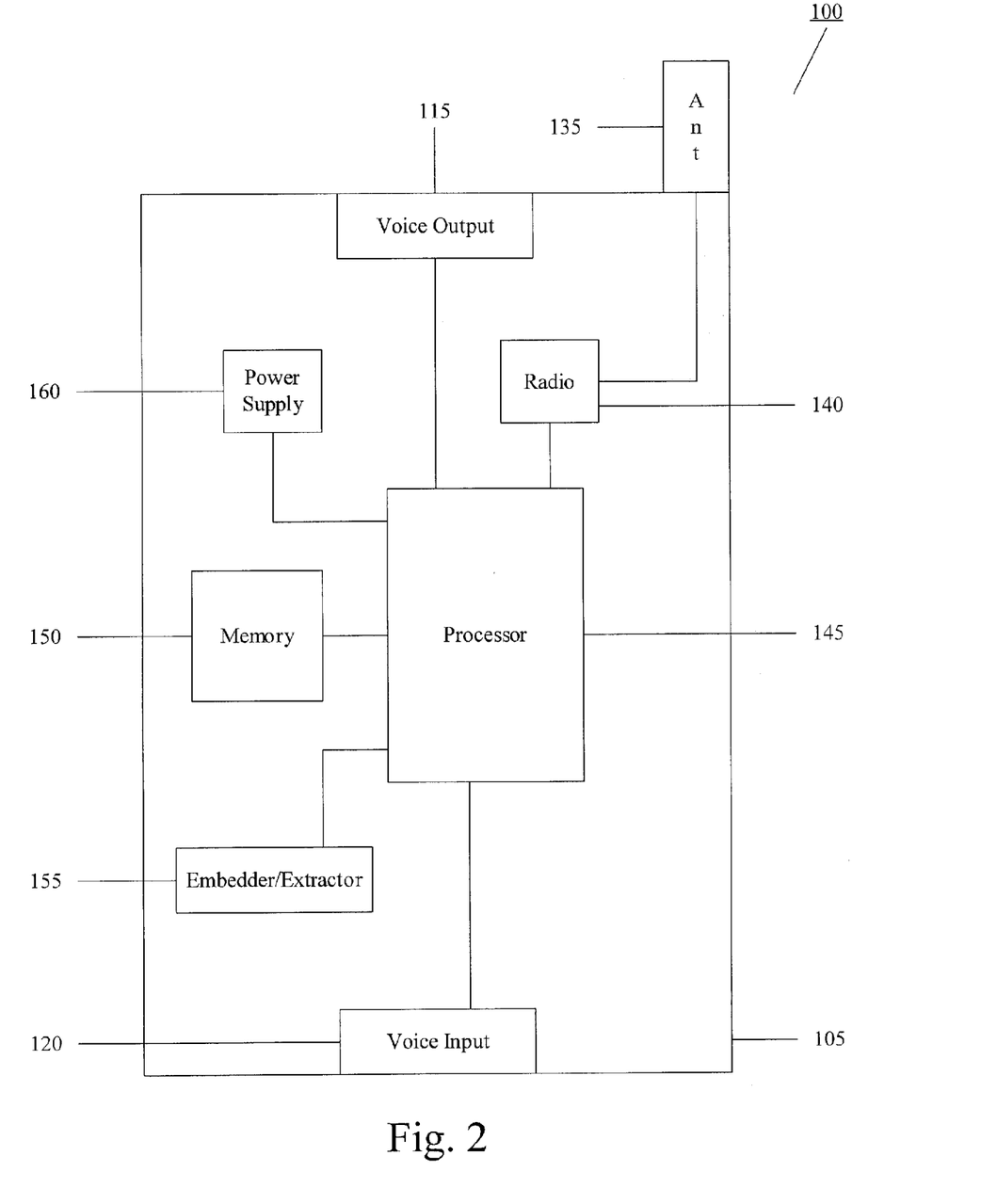
FIG. 2 shows an inside view of the mobile unit of FIG. 1.

FIG. 1 shows a perspective view of a mobile unit (MU) 100 according to an exemplary embodiment of the present invention. The MU 100 may include a housing 105, a display 110, a voice output 115, a voice input 120, a data input arrangement 125, a voice button 130, and an antenna 135. FIG. 2 shows an inside view of the mobile unit of FIG. 1. The inside view shows that the MU 100 may also include a radio 140, a processor 145, a memory 150, an embedder/extractor 155, and a power supply 160. It should be noted that the MU 100 may include further components such as device ports to connect further hardware, a data capturing device such as a barcode scanner, a laser scanner, a camera, etc. It should also be noted that the embedder/extractor 155 being a separate component is only exemplary and the functionality of the embedder/extractor 155 may be part of the processor 145 or other components, as will be discussed below. It should further be noted that the embedder/extractor 155 may be two separate devices where one device embeds the textual data while another device extracts the textual data.

The housing 105 provides a casing to at least partially house the components of the MU 100. The display 110 provides a visual interface in which a user may view content, input data, etc. The voice output 115 may be, for example, a speaker. The voice input 120 may be, for example, a microphone. In the exemplary embodiments, the voice input 120 may receive vocal data (e.g., a user speaks into the voice input 120) and create voice data packets upon digitization. In another exemplary embodiment, audio data may be retrieved as a pre-digitized audio stream that may be stored, for example, as a file in the memory 150. The data input arrangement 125 provides a mechanism to enable a user to input data. The data input arrangement 125 may include, for example, an alphanumeric key pad, a directional key pad, etc. The display 110 may also serve this function (e.g., touch screen). The voice button 130 may be used to allow a user to activate/deactivate the voice output 115 and the voice input 120. For example, an inactivated voice button 130 (e.g., unpushed) may activate the voice output 115 while an activated (e.g., pushed) voice button 130 may activate the voice input 120.

The processor 145 may be a central computing component that operates the MU 100. The radio 140 may be a communication device used to transmit/receive data via the antenna 135. The memory 150 may store data related to the MU 100 such as user identification, MU identification, location data, etc. This data may be entered on an ad hoc basis each time the MU 100 is used by a particular user. For example, when the MU 100 is activated, the user may be prompted to enter responses to various data fields. The data may also be stored in the memory 150 and retrieved upon an authentication and/or authorization of the user.

The embedder/extractor 155 may be a component that embeds data prior to a transmission and extracts data upon reception of a transmission. According to the exemplary embodiments of the present invention, the embedder/extractor 155 embeds textual data stored on the memory 150 into the digitized voice data packets when the MU is an MU in sending mode. The embedder/extractor 155 may also extract the embedded textual data when the MU is an MU in receiving mode. According to the exemplary embodiments, the radio 140 and antenna 135 transmits the voice data packets with embedded textual information. The power supply 160 may be, for example, a rechargeable battery.

Figure 3:
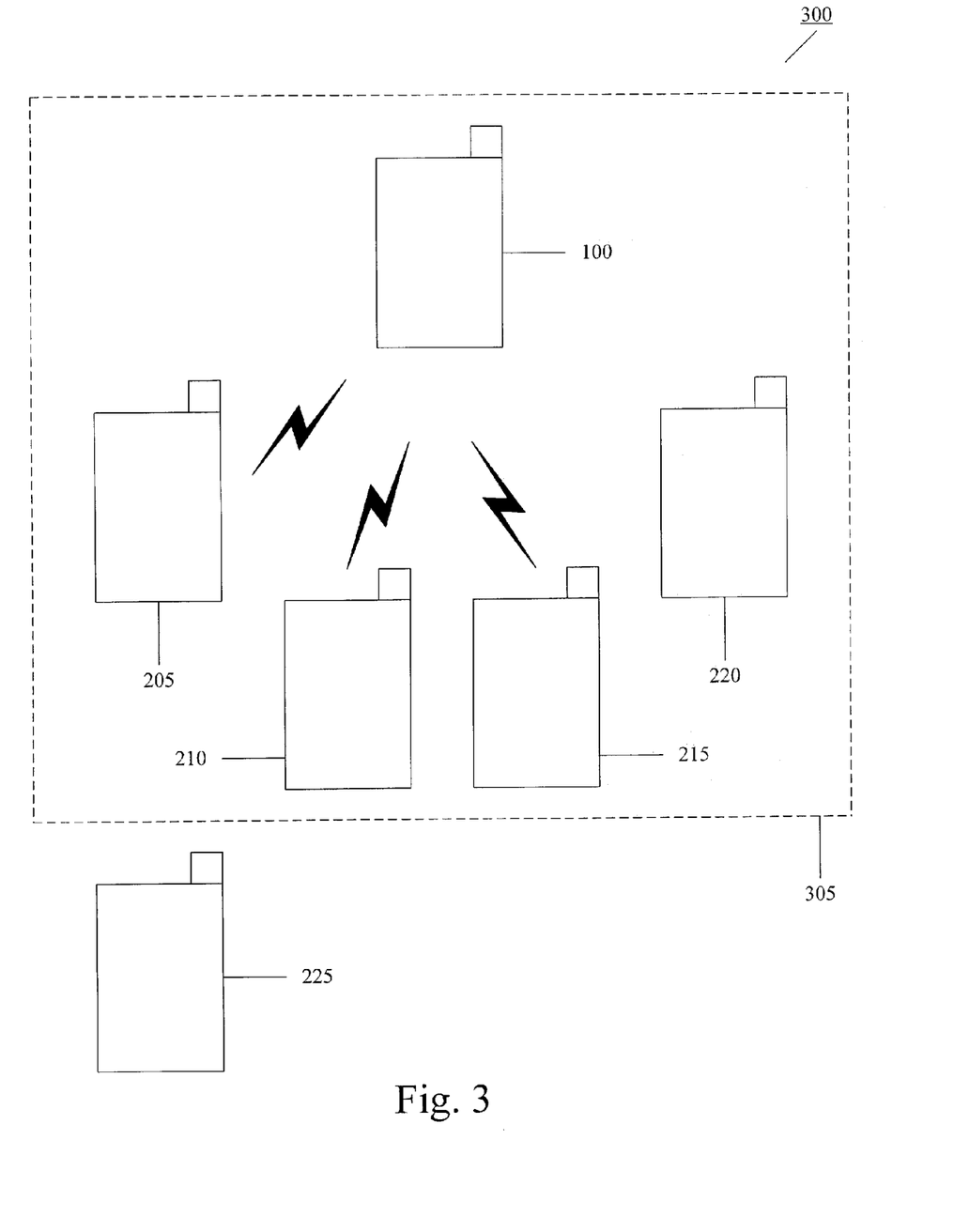
FIG. 3 shows a first system in which the mobile unit of FIG. 1 communicates with other mobile units according to an exemplary embodiment of the present invention.

FIG. 3 shows a first system 300 in which the mobile unit 100 of FIG. 1 communicates with other mobile units 205-225 according to an exemplary embodiment of the present invention. The first system 300 includes a plurality of MUs 100, 205-225. The MUs 205-225 may include substantially the same components as the MU 100. As discussed above, the MU 100 includes the radio 140 and the antenna 135. Those skilled in the art will understand that the radio 140 and the antenna 135 have a limited transmission range. The operating area 305 indicates the transmission range in which the MU 100 may send data. As illustrated, the MU 225 lies outside the operating area 305 and is unable to receive data from the MU 100. The MUs 205-220 lie within the boundaries of the operating area 305 and is capable of receiving data from the MU 100. Those skilled in the art will also understand that in a multicast transmission, the MUs may receive a transmission if the MU in sending mode operates on a channel and the MUs in receiving mode operate on the same channel. As illustrated, the MUs 205-215 are operating on the same channel as the MU 100 and are able to receive the transmission from MU 100. However, though the MU 220 is within the boundaries of the operating area 305, the MU 220 is operating on a different channel and is unable to receive the transmission. Furthermore, as stated above, regardless of whether the MU 225 operates on a common channel, the MU 225 is unable to receive any transmissions from the MU 100 because it is outside the operating area 305.

Figure 4:
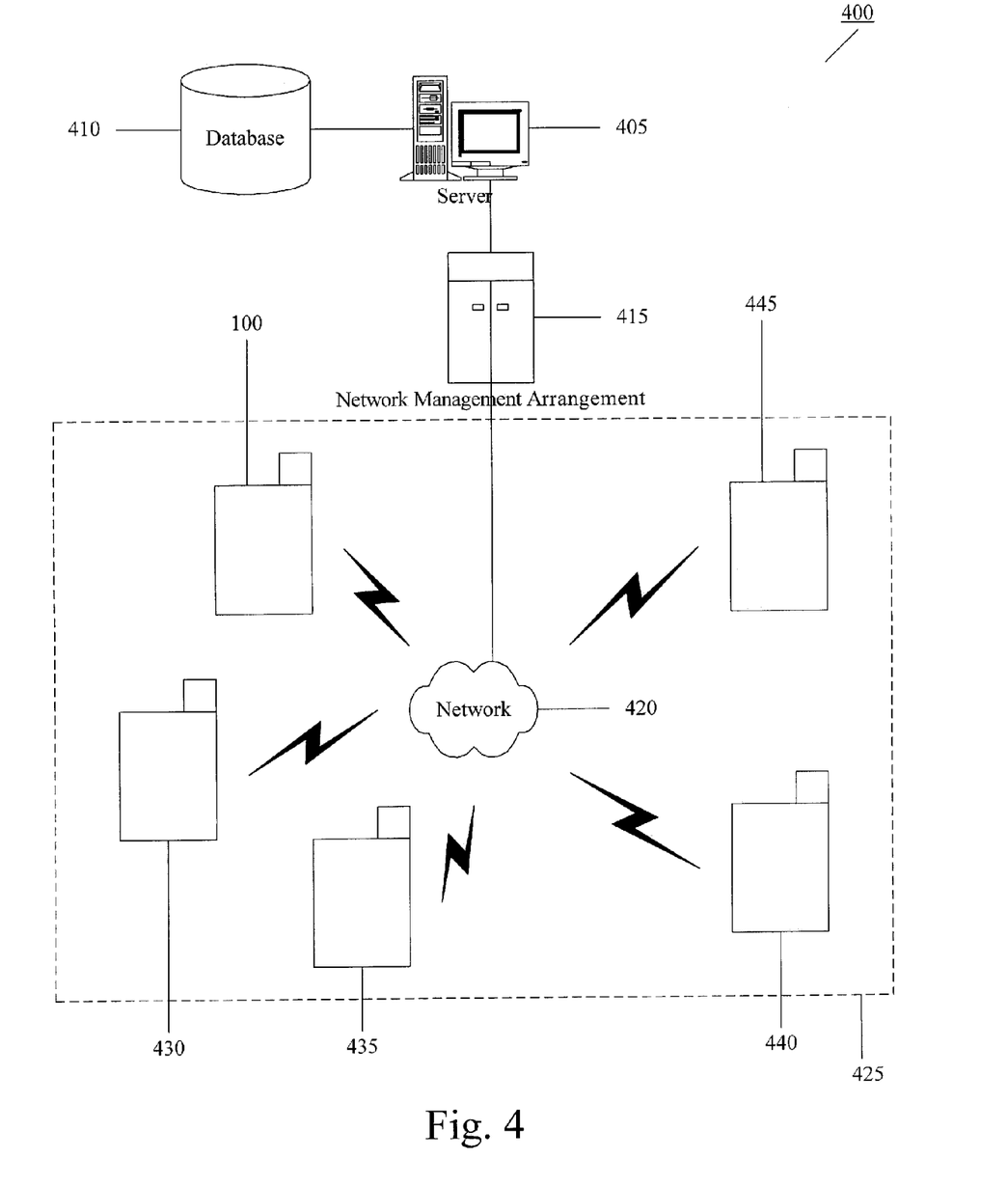
FIG. 4 shows a second system in which the mobile unit of FIG. 1 communicates with other mobile units according to an exemplary embodiment of the present invention.

FIG. 4 shows a second system 400 in which the mobile unit 100 of FIG. 1 communicates with other mobile units 430-445 according to an exemplary embodiment of the present invention. The second system 400 may include a server 405, a database 410, a network management arrangement 415, a network 420, and an operating area 425. The MUs 100, 430-445 are disposed within the operating area 425. The MUs 430-445 may include substantially the same components as the MU 100. It should be noted that the MUs may lie outside the boundaries of the operating area 425 and not be in communication with the network 420, similar to the MU 225 of the first system 300 of FIG. 3. In the exemplary embodiment, the MUs 100, 430-445 are in communication with the network 420.

The server 405 may be connected to the database 410. The database 410 may be a memory used to store data associated with the MUs 100, 430-445 such as the types of data stored in the memory 150 of MU 100. The data may be entered in a substantially similar manner as discussed above with the memory 150. However, with the larger capacity of the database 410, the data may already be stored and subsequently retrieved when a user is authenticated and/or authorized with the MU. The server 405 may additionally retrieve audio and/or textual data from the database 410 to create the voice data packets with embedded textual data. For example, if the server 405 receives audio data from an MU of a user (e.g., using an SIP VOIP call), prior to transmitting the audio data as a multicast transmission, textual data stored in the database 410 relating to the user (e.g., extracted from the SIP headers) may be embedded. In another example, audio data may be captured directly from the server (e.g., via a microphone disposed therein) by another user (e.g., system administrator). Then, for example, the audio data from the server may embed textual data (e.g., system administrator identification) and subsequently transmitted to all activated MUs in the network 420. Furthermore, in a system where MUs are deployed concurrently to users, the server 405 may synchronize the data contained in the memories so any user data stored on the database 410 will be preloaded into the MU.

The server 405 may also be connected to the network management arrangement (NMA) 415. The NMA 415 may cooperate with the server 405 to operate the network 420. In the exemplary embodiment, the NMA 415 may further be connected to the network 420. The network 420 includes an operating area 425. The server 405 and/or the NMA 415 may, via the network 420, be in communication with the MUs 100, 430-445 using wireless communications (e.g., 802.11x, WiFi, etc.).

It should be noted that the use of the NMA 415 is only exemplary and the server 405 alone may contain the functionalities to operate the system 400. Furthermore, the use of a single network 420 is only exemplary. The present invention may utilize multiple networks, thereby function in multiple, distinct operating areas. The present invention may also increase the operating area 425 using, for example, access points. The access points may be used to communicate with the MUs, via wireless communications. In addition, it should be noted that the server 405, the database 410, and the NMA 415 disposed outside the operating area 425 is only exemplary and these components may be present within the operating area 425.

Figure 5:
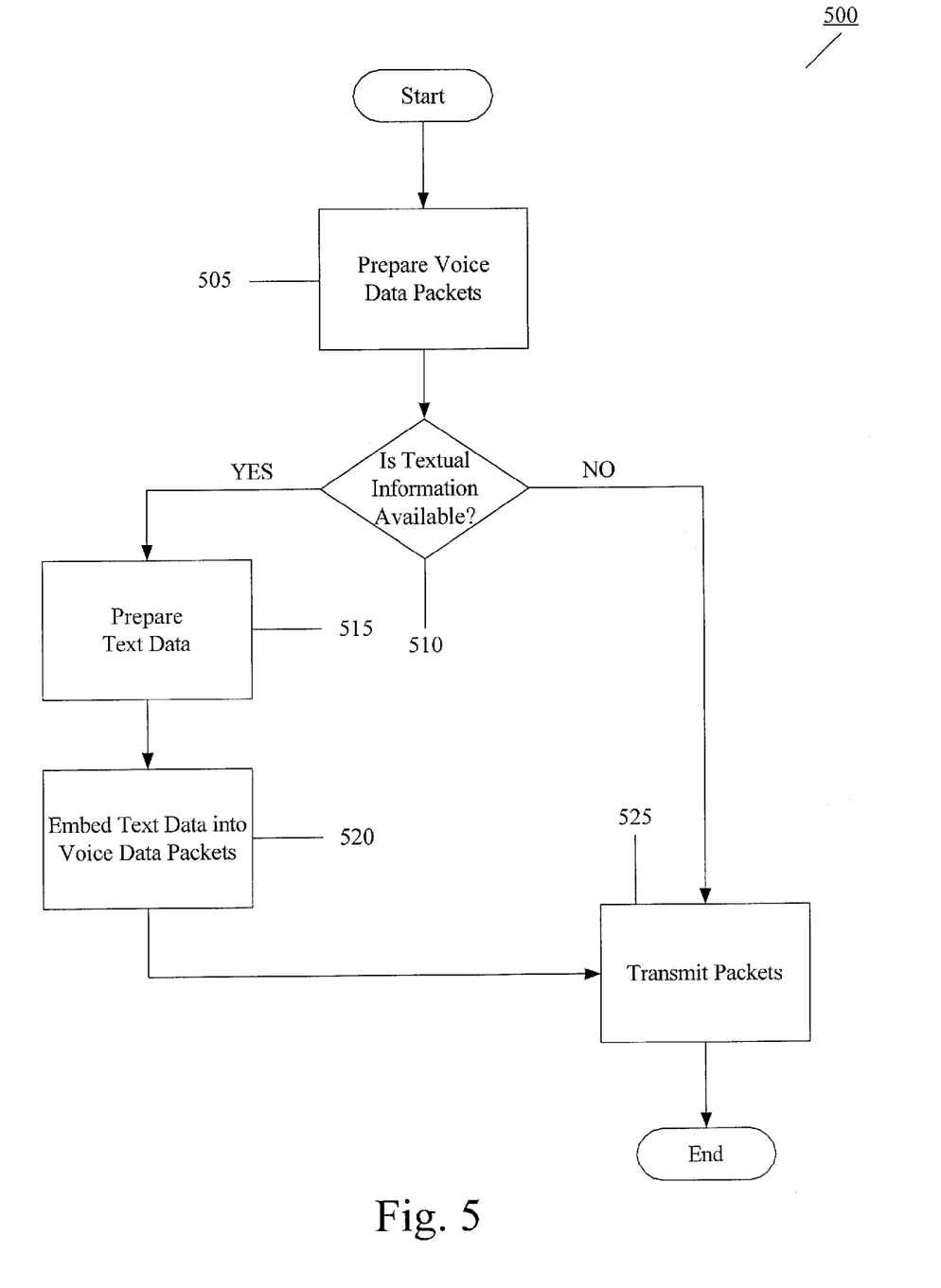
FIG. 5 shows a method in which the mobile unit of FIG. 1 transmits a multicast transmission with other mobile units according to an exemplary embodiment of the present invention.

FIG. 5 shows a method 500 in which the mobile unit 100 of FIG. 1 transmits a multicast transmission with other mobile units according to an exemplary embodiment of the present invention. It should be noted that the method 500 may be used in the first system 300 and the second system 400. Thus, the method 500 will be described with reference to the components of the first system 300 and the second system 400. Accordingly, the MU in sending mode may be the MU 100 and the other (i.e., receiving) MUs may be either the MUs 205-220 of the first system 300 or the MUs 430-445 of the second system 400. Furthermore, the use of the mobile unit 100 transmitting the multicast transmission in the method 500 is only exemplary. As discussed above, the server 405 may transmit the multicast transmission to the plurality of MUs in the network 420. In this case, the MU 100 may be part of the MUs in receiving mode.

The method 500 begins by preparing voice data packets in step 505. As discussed above, the voice data packets may be obtained by digitizing vocal data received through the voice input 120. The vocal data may be received when a user activates the voice input 120 by pressing the voice button 130. The voice data may also be retrieved from the memory 150 or the database 410. Once the voice data packets are prepared, a determination is made in step 510 whether textual information is available. As discussed above, the textual information may be stored in the memory 150 or in the database 410.

If textual information is not available, the method 400 continues to step 525 where only the voice data packets are transmitted. However, if textual information is available, the method 400 continues to step 515 where the textual information is converted into text data. Once prepared, the text data is embedded via the embedder/extractor 155 into the voice data packets in step 520. It should be noted that the embedder/extractor 155 of the MU embedding the text data into the voice data packets is only exemplary and other components may perform the embedding such as the server 405. Once embedded, the voice data packets with embedded text data are transmitted in step 525. The transmission of the packets (e.g., voice data packets with or without the embedded text data) may be performed by the MU 100 directly with the MUs in receiving mode or indirectly through the server 405, the NMA 415, etc. via the network 420.

Figure 6:
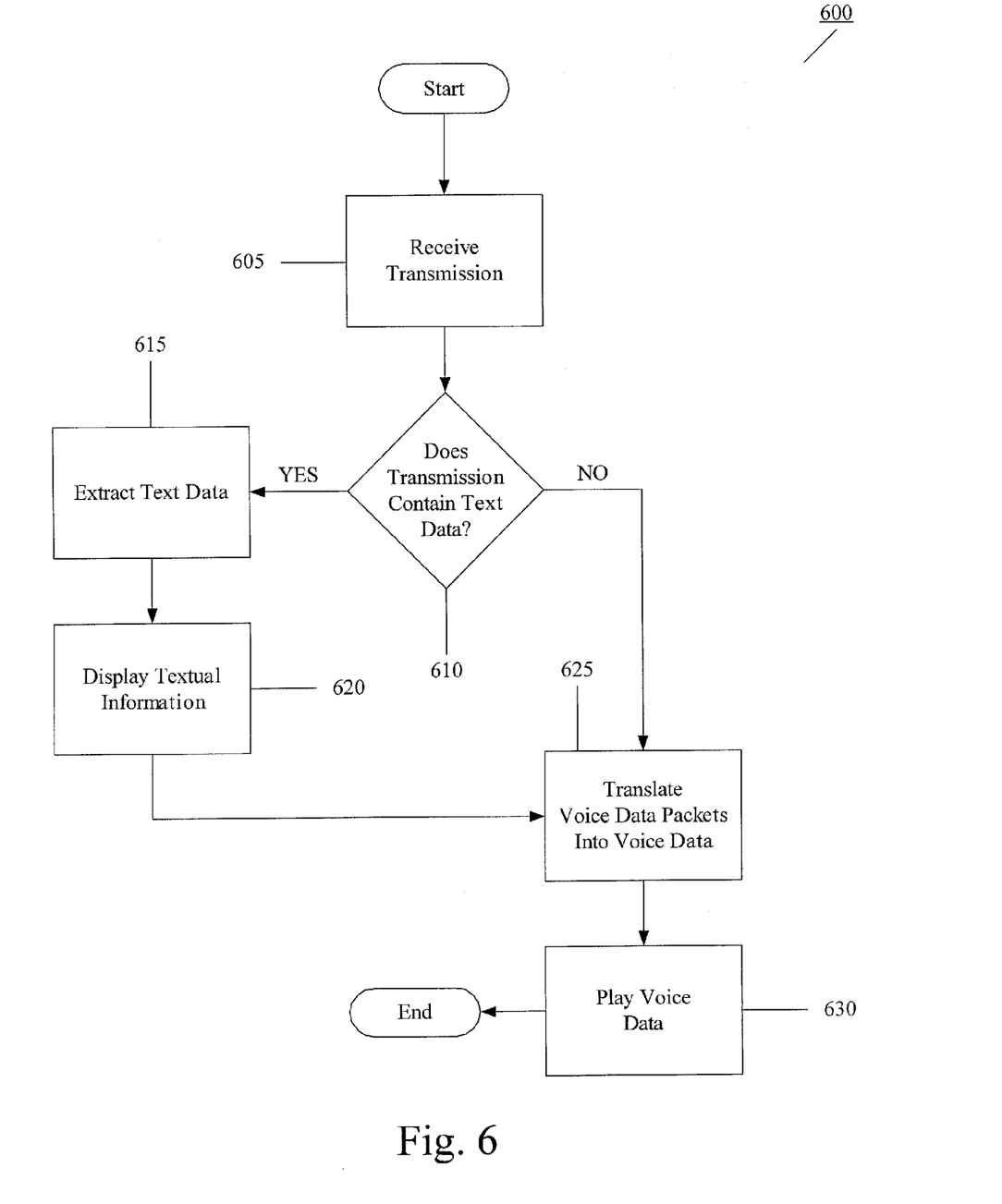
FIG. 6 shows a method in which other mobile units receive a multicast transmission from the mobile unit of FIG. 1 according to an exemplary embodiment of the present invention.

FIG. 6 shows a method 600 in which other mobile units receive a multicast transmission from the mobile unit 100 of FIG. 1 according to an exemplary embodiment of the present invention. It should be noted that the method 600 may also be used in the first system 300 and the second system 400. Thus, the method 600 will be described with reference to the components of the first system 300 and the second system 400. Accordingly, the MU in sending mode may be the MU 100 and the other (i.e., receiving) MUs may be either the MUs 205-220 of the first system 300 or the MUs 430-445 of the second system 400. Also, as discussed above, the other mobile units may receive the multicast transmission from the server 405 and the mobile unit 100 may be part of the other mobile units that receive the transmission.

The method 600 begins when the other MUs receive the transmission. As discussed above, the other MUs are capable of receiving the transmission when the other MUs operate on the same channel as the MU 100. Thus, with respect to the first system 300, the MUs 205-215 receive the transmission. With respect to the second system 400, the MUs 430-440 receive the transmission. Furthermore, the other MUs may receive the transmission directly from the MU in sending mode 100 or indirectly from the server 410, the NMA 415, etc. via the network 420. It should be noted that since the exemplary methods pertain to multicast transmissions, it is assumed that at least voice data packets are contained in the transmission. Once the transmission is received, a determination is made whether the transmission contains text data in step 610.

If text data is absent, then the method proceeds to step 625 where the voice data packets are translated into vocal data. If text data is present, then the method proceeds to step 615 where the text data is extracted by the embedder/extractor 155. Upon extraction, the textual information is displayed in step 620 to the user on the display 110. Upon display, the remaining voice data packets are translated into vocal data at step 625. Upon translation, the vocal data is played in step 630 through, for example, the voice output 120.

It should be noted that the use of identification data to be embedded into the voice data packets is only exemplary. The present invention may incorporate any form of textual information that may be relevant or extraneous such as department codes, MU model numbers, weather forecasts, astrological signs, etc. In addition, the use of textual data to be embedded in the voice data packets is only exemplary. The present invention may embed other types of data into the transmission. For example, command data may be embedded so that upon reception of the voice data packets with embedded command data, the MU in receiving mode recognizes the command to, for example, display content, execute a program, close a program, perform a functionality, sounding an alert, illuminating an indicator, etc. Furthermore, it should be noted that the use of voice data packets is only exemplary. The present invention of embedding textual information may also occur in a non-audio payload such as a text multicast (e.g., advertisements, memos, etc.).

The present invention affords further advantages over conventional mobile devices capable of multicast transmissions. The present invention allows the receivers to instantly ascertain the identity, location, etc. of the sender by looking at the display of the MU. For example, if the MUs are used by employees of a warehouse, one employee may multicast a transmission for aid in moving an item. The other employees may know the identity and location of the sender. Thus, the other employees in proximity to the sender may readily assist the sender.

Furthermore, conventional mobile devices that operate only as walkie-talkie transmitters often lack a display. The present invention provides information regarding the sender but also provide the advantages inherit with providing a display on the MU. It should be noted that the above described advantages are only exemplary and that other advantages exist for the system and method described above.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
    receiving, by a server, voice data from a mobile unit of a user using a VOIP call;
    retrieving, by the server, non-voice data relating to the user from a database;
    embedding, by the server, the non-voice data relating to the user within digitized voice data; and
    wirelessly transmitting, by a computing device, the digitized voice data with the embedded non-voice data as a multicast transmission to a plurality of mobile devices.

2. The method of claim 1, wherein the computing device transmits one of directly to the plurality of mobile devices and indirectly to the plurality of mobile devices through a network.

3. The method of claim 2, wherein, when the computing device transmits directly, the plurality of mobile devices are disposed in a first operating area of the computing device.

4. The method of claim 2, wherein, when the computing device transmits indirectly, the plurality of mobile devices are disposed in a second operating area of the network.

5. The method of claim 1, wherein the computing device and the plurality of mobile devices operate on a common channel.

6. The method of claim 1, wherein the non-voice data includes at least one of identification data, location data, and command data.

7. A computing device, comprising:
    a receiver on a server for receiving voice data from a mobile unit of a user using a VOIP call;
    a database storing non-voice data relating to the user;
    an embedder on the server for embedding the non-voice data relating to the user retrieved by the server within digitized voice data; and
    a transmitter wirelessly transmitting the digitized voice data with the embedded non-voice data as a multicast transmission to a plurality of mobile devices.

8. The computing device of claim 7, wherein the receiver receives the non-voice data from one of a memory of the computing device, an audio input of the computing device, and a database of the server.

9. The computing device of claim 7, wherein the transmitter transmits one of directly to the plurality of mobile devices and indirectly to the plurality of mobile devices through a communication network.

10. The computing device of claim 9, wherein, when the computing device transmits directly, the plurality of mobile devices are disposed in a first operating area of the computing device.

11. The computing device of claim 9, wherein, when the computing device transmits indirectly, the plurality of mobile devices are disposed in a second operating area of the network.

12. A method, comprising:
  receiving, by a server, voice data from a mobile unit of a user using a VOIP call;
  retrieving, by a server, non-voice data relating to the user from a database;
  embedding, by a computing device, non-voice data relating to the user within digitized voice data;
  wirelessly transmitting the digitized voice data with the embedded non-voice data as a multicast transmission;
  wirelessly receiving, by a plurality of mobile devices, the multicast transmission;
  extracting, by each mobile device, the non-voice data from the digitized voice data;
  executing, by each mobile device, a function corresponding to a type of the non-voice data; and
  playing, by each mobile device, the voice data.

13. A system, comprising:
  a computing device including a receiver receiving voice data from a mobile unit of a user using a VOIP call, a database storing non-voice data relating to the user, an embedder on a server for embedding the non-voice data relating to the user retrieved by the server within digitized voice data, and a transmitter wirelessly transmitting the digitized voice data with the embedded non-voice data as a multicast transmission; and
  a plurality of mobile devices, each of the mobile devices including a receiver wirelessly receiving the multicast transmission, an extractor extracting the non-voice data from the digitized voice data, a processor executing a function corresponding to a type of the non-voice data, and an audio output playing the voice data.

* * * * *